No. 771,489. PATENTED OCT. 4, 1904.
A. J. O'REILLY.
CONNECTING ROD.
APPLICATION FILED APR. 14, 1904.
NO MODEL.
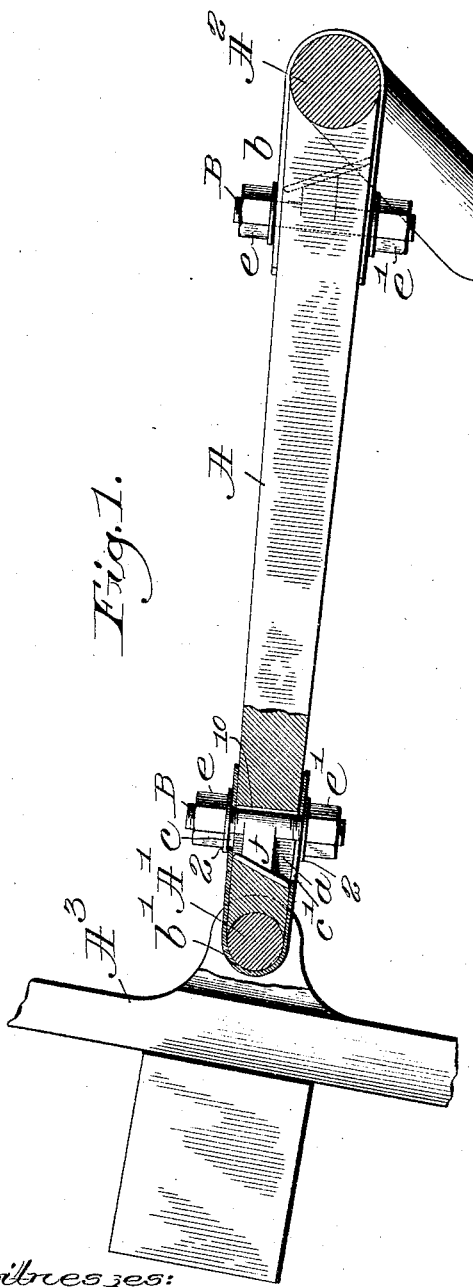
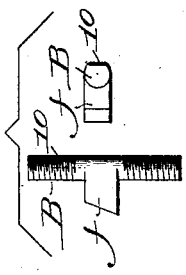

No. 771,489. Patented October 4, 1904.

UNITED STATES PATENT OFFICE.

ANTHONY J. O'REILLY, OF WORCESTER, MASSACHUSETTS, ASSIGNOR TO CROMPTON THAYER LOOM COMPANY.

CONNECTING-ROD.

SPECIFICATION forming part of Letters Patent No. 771,489, dated October 4, 1904.

Application filed April 14, 1904. Serial No. 203,079. (No model.)

*To all whom it may concern:*

Be it known that I, ANTHONY J. O'REILLY, a citizen of the United States, residing at Worcester, in the county of Worcester and State of Massachusetts, have invented an Improvement in Connecting-Rods, of which the following description, in connection with the accompanying drawings, is a specification, like characters on the drawings representing like parts.

This invention has for its object the production of a novel connecting-rod for connecting shafts, crank-pins, and other parts of machinery where one part derives motion through the connecting-rod from another part.

In accordance with my invention I have combined with the connecting-rod and strap embracing the end thereof a bolt or device which is threaded at its opposite ends and has between its ends an inclined surface. A nut screwed onto one end of said threaded bolt may draw the device so that its incline will cause the bolt to be moved longitudinally of the connecting-rod and draw a metal strap longitudinally with relation to said connecting-rod, so as to bind the shaft or crank-pin embracing the same, and thereafter by turning the other nut the clamping-strap may be firmly seated on the connecting-rod.

Figure 1, in side elevation, shows one end of a connecting-rod applied to a loom, one of the straps at one end of the connecting-rod being represented in section, the strap-seating nut not being, however, represented as being turned and fully set, as at the right of said figure. Fig. 2 is a plan view of only one side of the end of the connecting-rod, the wear-plate being omitted. Fig. 3 shows the strap straightened out to show the shape of the holes therein, and Fig. 4 shows the bolt or device detached.

The connecting-rod A may be of metal or wood and of any desired shape and length, it having its ends concaved to embrace a pin $A'$, carried by the lay $A^2$ of a loom, and the wrist of a shaft $A^2$, that may be part of the crank-shaft of a loom.

This invention is not, however, to be limited to its use only in looms. The connecting-rod has near each end like passages $a$, (shown best in Figs. 2 and 3,) said passages being made as slots extending from the upper to the lower side of the connecting-rod and preferably tapered at one side.

The tapered side of the slot in the connecting-rod may sustain a wear-block $a'$. The connecting-rod has at its ends metal straps $b\ b'$, that are to be drawn snugly against the pin $A'$ or shaft $A^2$, it being necessary in use to provide for adjusting said straps to take up for wear between the strap and the pin or shaft.

The metal straps, normally of U shape, have near their ends (see Fig. 3) two holes $c\ c'$. The hole $c'$ is the longer, and preferably the end of the strap having the shorter hole $c$ will rest at the upper side (see Fig. 2) of the connecting-rod. To draw this strap to hug the shaft or pin snugly, I employ a bolt or device B, having a cam-face $f$ between its ends, said cam-face being at the end of a projection extending laterally from the longitudinal axis of the device. The device is threaded at its opposite ends and is slabbed off, as at 10, Fig. 4, opposite the inclined face $f$.

After passing a strap, as $b'$, over the end of the connecting-rod the bolt or device B, the nuts $e\ e'$ being removed, will be inserted in the passage $a$, and the inclined face $f$ of the projection will contact with the inclined wear-plate $a'$ in said slot.

Now as the nut $e$ is rotated the action of the inclined face of the device against the inclined wear-plate moves the device bodily in the direction of the length of the connecting-rod and causes the slabbed part 10, acting on the edges 12 and 13 of the slots $c$ and $c'$ in the strap to draw said strap farther onto the connecting-rod and clamp the pin, or it may be the shaft, snugly.

In this condition it may be supposed that the end of the strap having the longer slot $c'$ substantially or nearly touches the under side of the connecting-rod, and now by turning the nut $e'$ on the threaded end of the device that portion of the strap may be seated snugly on the connecting-rod, as shown at the right, Fig. 1. I interpose between the strap and nuts suitable washers 2.

Prior to this invention in looms having usual connectors between the crank-shaft and lay whenever the connector becomes loose, owing to wear either of the connector or the crank-shaft or of the pin of the lay, so that there is undue play, it has been necessary for the weaver to send for the loom-fixer, who, by means of wrenches and special tools having considerable leverage and resting against the back of the lay, pulls or draws the strap to cause the connector to fit the lay-stud or crank-wrist, this taking sometimes many minutes. The connector, especially on high-speed looms, very often becomes loosened either at the lay or crank ends and is unnoticed by the weaver or let go owing to the trouble of hunting up a fixer and the necessity of stopping the loom, which results in a loss of output of the loom to the weaver. It is therefore obvious that providing means for readily effecting the adjustment of this connector to its points of contact is a step in advance, and as I am, as far as I am aware, the first to devise means by which the weaver is able any number of times a day to see to the proper adjustment of this important part of the loom I do not wish to limit myself to the exact construction represented, as it is obvious that there are many ways of effecting this adjustment that would be suggested from the specification and drawings.

In automatic looms (especially the well-known Northrup loom) it is necessary to have a very perfect running fit, inasmuch as the bobbin is changed on the front center, and any undue vibration or wrong position of the lay would cause interference with the proper operation of the automatic bobbin-replenishing means.

Having described my invention, what I claim as new, and desire to secure by Letters Patent, is—

1. A connecting-rod having a passage provided with an inclined side, a strap inclosing said connecting-rod and having slots near its ends, a device extended through the slots of said strap and the passage of said connecting-rod and having a lateral projection between its ends, and means to draw said device into the passage of the connecting-rod and through said slots, that said device may draw the strap farther onto said rod.

2. A connecting-rod having a passage provided with an inclined side, a strap inclosing said connecting-rod and having slots near its ends, a device extended through the slots of said strap and the passage of said connecting-rod and having a lateral projection between its ends, and means to draw said device into the passage of the connecting-rod and through said slots, that said device may draw the strap farther onto said rod, and a wear-plate in said passage against which said projection contacts as the device is drawn into said space.

3. A connecting-rod having a passage provided with an inclined side, a strap inclosing said connecting-rod and having slots near its ends, a device extended through the slots of said strap and the passage of said connecting-rod and having a lateral projection between its ends provided with a cam-face to contact with the inclined side of said passage, a nut on one end of said device to draw the same into said slot and draw the strap farther on the connecting-rod, and a nut at the opposite end of said device to act on one end of said strap and seat it on said connecting-rod.

In testimony whereof I have signed my name to this specification in the presence of two subscribing witnesses.

ANTHONY J. O'REILLY

Witnesses:
ROBT. C. DOUGLAS,
CHARLES F. ALDRICH.